(12) United States Patent
Batash

(10) Patent No.: US 11,221,503 B2
(45) Date of Patent: Jan. 11, 2022

(54) TEMPLE ORNAMENTATION KITS FOR EYEGLASSES AND METHODS OF USING THEREOF

(71) Applicant: CLOOZZ LTD., Bat Yam (IL)

(72) Inventor: Simon Batash, Bat Yam (IL)

(\*) Notice: Subject to any disclaimer, the term of this patent is extended or adjusted under 35 U.S.C. 154(b) by 219 days.

(21) Appl. No.: 16/479,937

(22) PCT Filed: Feb. 28, 2018

(86) PCT No.: PCT/IL2018/050226
§ 371 (c)(1),
(2) Date: Jul. 23, 2019

(87) PCT Pub. No.: WO2018/158769
PCT Pub. Date: Sep. 7, 2018

(65) Prior Publication Data
US 2019/0377197 A1    Dec. 12, 2019

(30) Foreign Application Priority Data
Mar. 1, 2017 (IL) .......................................... 250880

(51) Int. Cl.
*G02C 11/02*    (2006.01)
(52) U.S. Cl.
CPC .................... *G02C 11/02* (2013.01)
(58) Field of Classification Search
CPC ..................................................... G02C 11/02
See application file for complete search history.

(56) References Cited

U.S. PATENT DOCUMENTS

| | | | |
|---|---|---|---|
| 2,960,787 A | 11/1960 | Jacobson | |
| 3,010,365 A | 11/1961 | Sadel | |
| 4,153,346 A | 5/1979 | Gomer | |
| 4,471,509 A | 9/1984 | Marks | |
| 4,968,128 A * | 11/1990 | Mendola | G02C 11/02 351/51 |
| 4,974,955 A | 12/1990 | Treadaway, Sr. | |
| 5,161,234 A | 11/1992 | Seelex | |
| 5,497,211 A | 3/1996 | McNulty | |

(Continued)

FOREIGN PATENT DOCUMENTS

| | | |
|---|---|---|
| CN | 201080102 Y | 7/2008 |
| CN | 204807846 U | 11/2015 |

(Continued)

*Primary Examiner* — Tuyen Tra

(57) ABSTRACT

The present invention relates to temple ornamentation kits for eyeglasses and methods of using thereof. The temple ornamentation kit includes a temple attaching device locked into an ornamental article having a flat back side, wherein a locking ring saddle is securely extending away from the flat back, generally perpendicular thereto. Furthermore, the temple attaching device is made of elastic materials having a latch portion and an annuloid portion that are interconnected by a stem portion, wherein the latch portion is configured to be inserted into and through the locking ring saddle of the ornamental article and lock there onto; and wherein the annuloid portion, being for example circular or oval, is configured to allow a temple of a pair of eyeglasses to be inserted there through, wherein the inner opening of the annuloid portion is sized to grip the temple at a selected location.

19 Claims, 14 Drawing Sheets

(56) References Cited

U.S. PATENT DOCUMENTS

| | | | |
|---|---|---|---|
| 5,654,787 A * | 8/1997 | Barison | G02C 3/003 |
| | | | 351/157 |
| 5,896,184 A | 4/1999 | Lowe | |
| 6,863,394 B1 | 3/2005 | Nelson | |
| 7,698,836 B2 | 4/2010 | Schmelzer et al. | |
| 8,549,879 B2 * | 10/2013 | Mellinger | A44C 25/007 |
| | | | 63/23 |
| 9,354,454 B1 | 5/2016 | Tharp | |
| 2007/0006502 A1 | 1/2007 | Schmelzer et al. | |
| 2008/0273162 A1 | 11/2008 | Porter | |
| 2009/0066908 A1 | 3/2009 | Esses | |
| 2015/0062527 A1 | 3/2015 | Akoubians | |

FOREIGN PATENT DOCUMENTS

| | | |
|---|---|---|
| CN | 204883093 U | 12/2015 |
| KR | 20090002084 U | 3/2009 |

\* cited by examiner

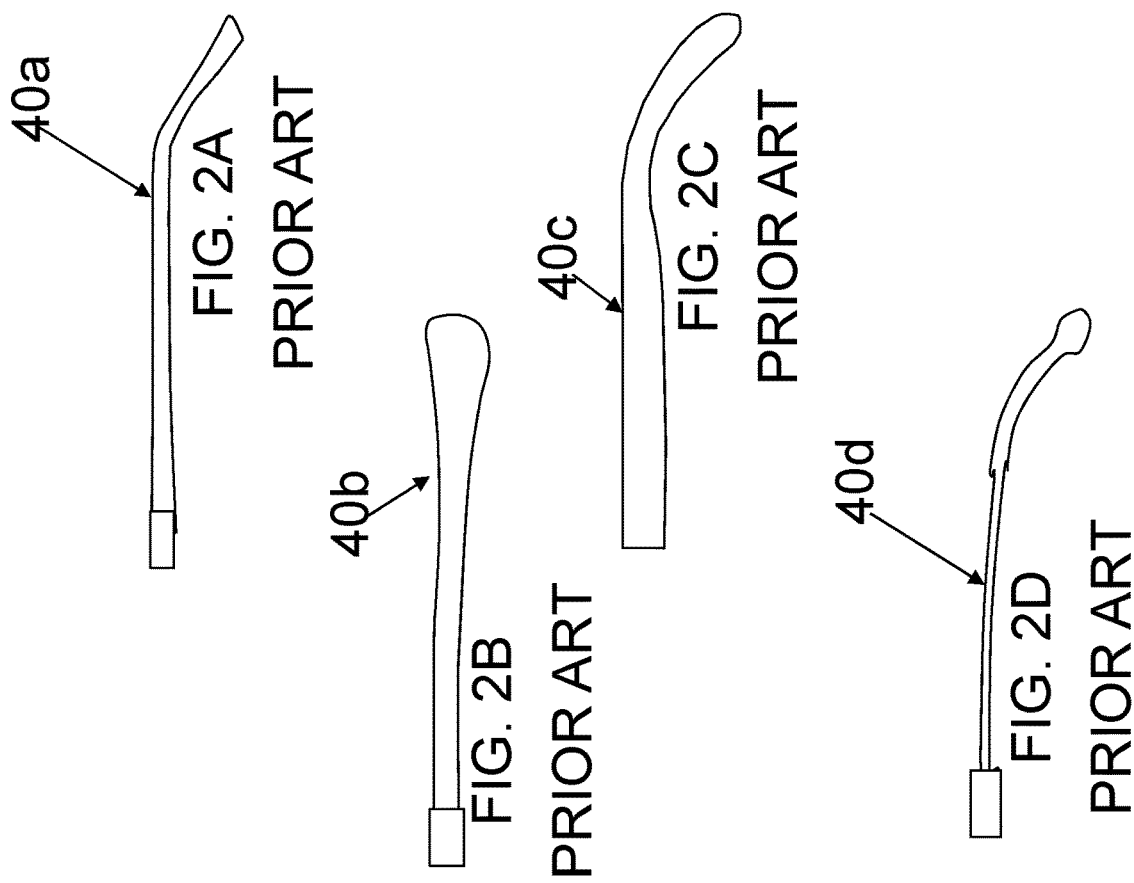
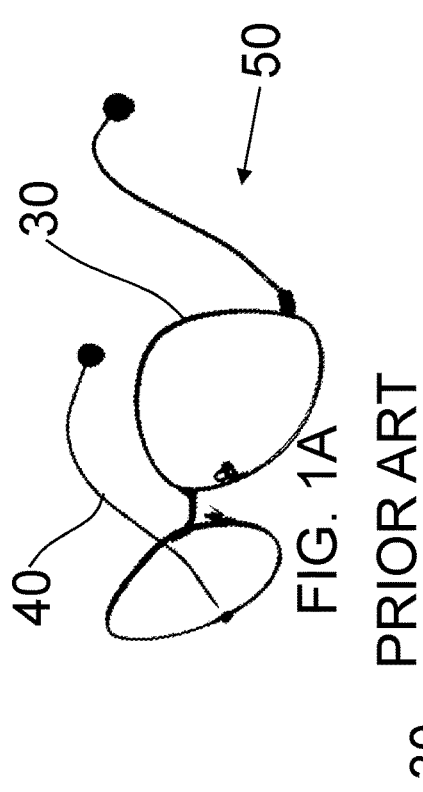
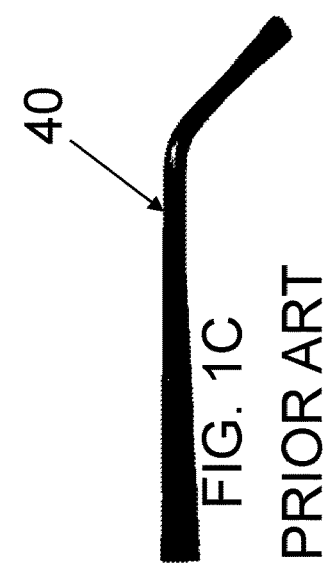

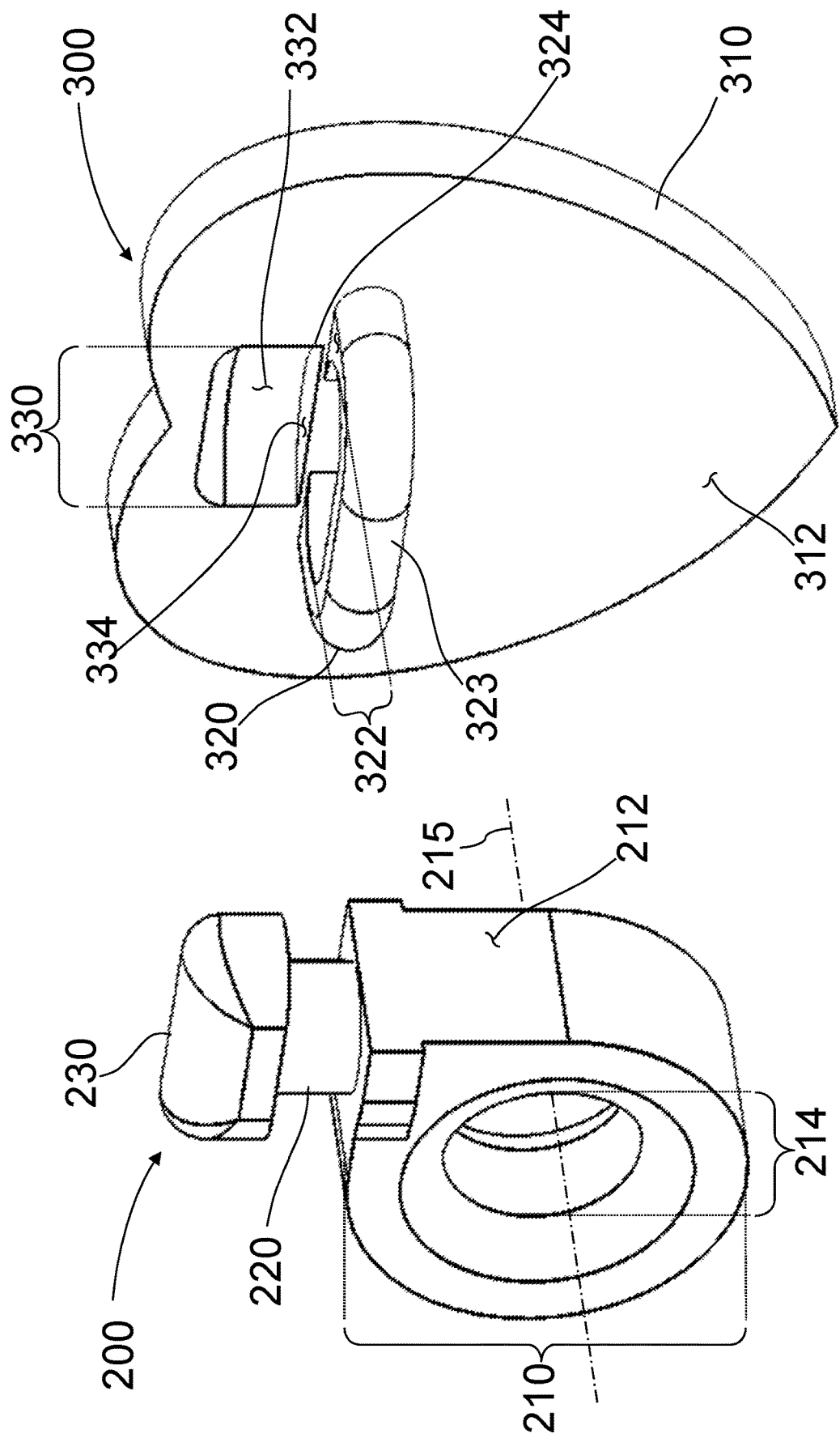

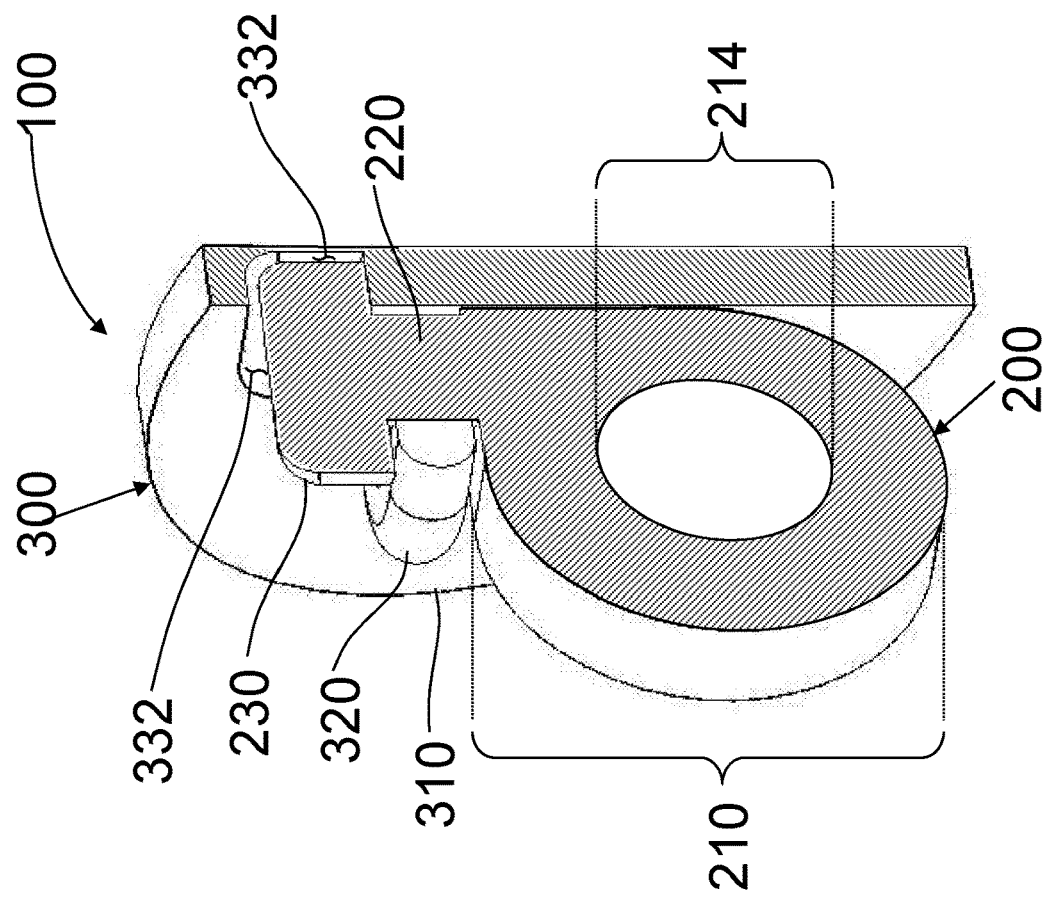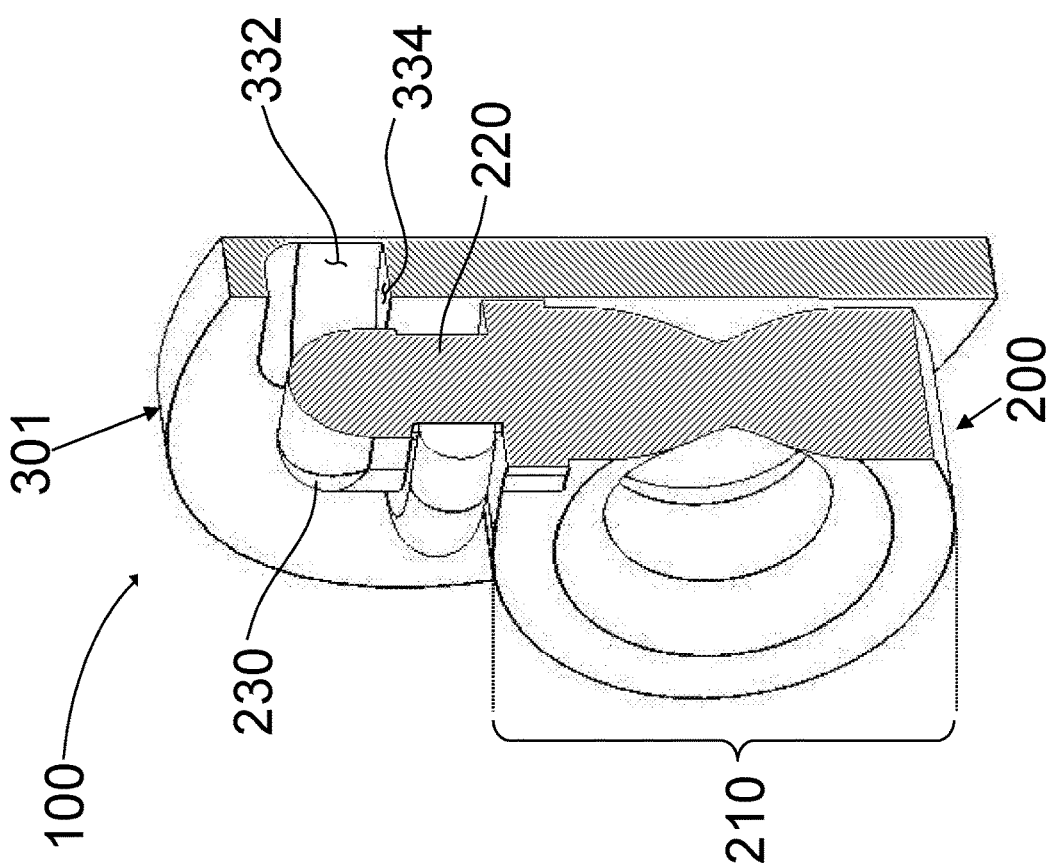

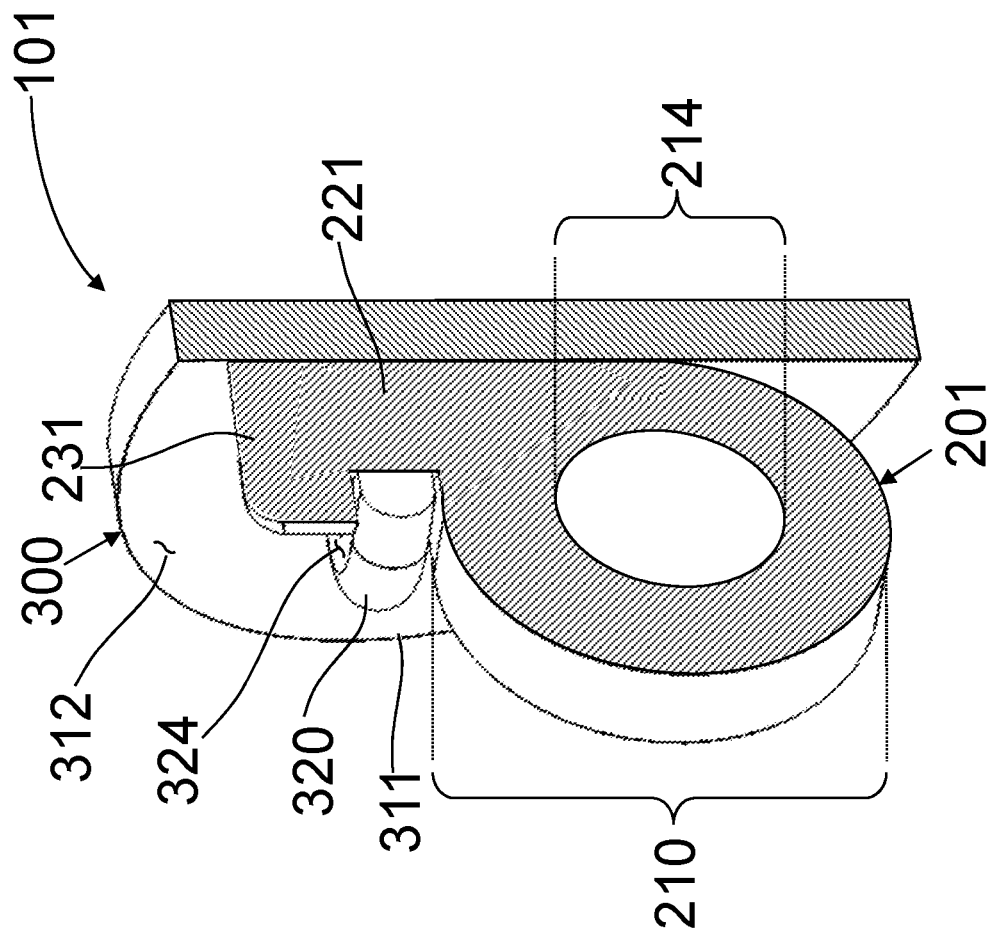

TEMPLE ORNAMENTATION KITS FOR EYEGLASSES AND METHODS OF USING THEREOF

RELATED APPLICATIONS

This application is a National Phase of PCT Patent Application No. PCT/IL2018/050226, entitled TEMPLE ORNAMENTATION KITS FOR EYEGLASSES AND METHODS OF USING THEREOF, having International filing date of 28 Feb. 2018, which claims the benefit of Israeli Patent Application No. 250880 filed on 1 Mar. 2017. The contents of the above applications are all incorporated by reference as if fully set forth herein in the entirety.

FIELD OF THE INVENTION

This invention relates to ornaments for eyeglasses, and more particularly to ornaments and decorations that are attachable to eyeglasses temples.

BACKGROUND OF THE INVENTION

Ornamental articles, such as jewelry, that are designed to hang on the temples of eyeglasses are known in the art.

U.S. Pat. No. 2,960,787 by inventor Quinones et al. Teaches means for mounting an ornament that is fixed in place and requires altering the eyeglasses to accommodate an ornament.

U.S. Pat. No. 3,010,365 by inventor Sadel teaches attachment to the distal ends of the temples (ear pieces) of eyeglasses for the purpose of maintaining the eyeglasses to the wearer during sporting events. Ornamentation is added to the ear piece attachments.

U.S. Pat. No. 4,968,128 by inventor Mendola teaches a removable fixed in position rigid hinged metal clip for attaching ornamentation to the temple of eyeglasses.

U.S. Pat. No. 4,974,955 by inventor Treadaway and U.S. Pat. No. 4,153,346 teaches attaching ornaments to the distal end or ear attachment end of the temple.

U.S. Pat. No. 5,161,234 by inventor Nitta teaches attaching ornaments to the screw utilized to connect the temple to the lens frame of eyeglasses.

U.S. Pat. No. 5,497,211 by inventor McNulty teaches a generally plainer surface member with slots that can be attached to the temple piece of eyeglasses to display a pennant or the like.

U.S. Pat. No. 5,896,184 by inventors Lowe and Kron teach an ornamentation for the temple pieces of ordinary eyeglasses, hanging freely thereon, wherein two resilient "O" ring is sized to grip the temple piece(s) and serve as stoppers that limits the motion of the ornamentation there between.

U.S. Pat. No. 6,863,394 by inventors Nelson and Baskom teach an ornamental attachment for selective attachment to an existing pair of eyeglasses having hinged junctions that utilize hinge screws that are selectively removable therefrom, for enhancing the visual appeal of the pair of eyeglasses.

U.S. Pat. Application No. US2008273162 by inventor Porter teaches a method of attachment for jewelry onto the temple arm or arms of a pair of eyeglasses is provided so that the wearer may adorn the eyeglasses in a purely esthetic manner.

U.S. Pat. No. 9,354,454 by inventor Frances Tharp teaches n eyeglass tether attachment system is a device that is used in pairs to attach to the ear-pieces of a pair of glasses that each end of a tether can be securely attached to. In addition, the exterior facing surface of the device can display a picture, sports indicia, or initials. The device has a spool and a cap that snap together and spring-rotate in relation to each other to open a passageway for inserting the eyeglass ear-piece. The cap has an integrally formed ring for attaching to the ends of a tether.

U.S. Pat. No. 7,698,836 by inventors Schmelzer Richard and Sheri teach a system for securing a decorative accessory to a shoe, the system comprising a shoe having an upper portion, the upper portion having an inner surface, an outer surface, and at least one stretchable hole; a shaft having first and second ends; a first shoulder secured to the first end of the shaft, the first shoulder being configured for insertion through the at least one stretchable hole in the upper portion of the shoe and to engage the inner surface of the upper portion of the shoe; a second shoulder secured to the second end of the shaft, the second shoulder being configured to engage the shoe; and a third shoulder adjacent to the second shoulder, the third shoulder comprising the decorative accessory.

There are is a large variety of eyeglasses, but most all of them have a front frame and a pair of temples. FIG. 1a (prior art) depicts an example pair of eyeglasses 50. FIG. 1b (prior art) depicts an example front 30 of a pair of eyeglasses. FIG. 1c (prior art) depicts an example temple 40 of a pair of eyeglasses. FIGS. 2a-2d (prior art) depict other examples of temples (40a-40d) for eyeglasses, that come in various shape and sizes.

Applicant's invention provides a new and unique solution attachment of ornamentation to the temple piece of eyeglasses.

SUMMARY OF THE INVENTION

According to the teachings of the present invention, there is provided a temple-ornamentation kit for eyeglasses facilitating the attachment of an ornamental article to a temple (40) of eyeglasses (50), the temple-ornamentation kit including a temple attaching device and an ornamental article.

The temple attaching device includes an annuloid portion, having an enclosed inner opening, wherein the inner opening has an axis; and an ornament locking portion. The temple attaching device is a single unit, made of elastic materials. The ornamental article includes an ornament portion; and an attachment interface locking portion.

When operatively attaching the temple-ornamentation kit to a temple (40) of eyeglasses (50), the temple is passed through the enclosed inner opening of the annuloid portion, wherein the enclosed inner opening of the annuloid portion is sized to grip the temple at a selected location. The ornament locking portion is a single unit, configured to interlock with the attachment interface locking portion, wherein when the ornament locking portion is interlocked with the attachment interface locking portion, the ornamental article is facing away from the temple.

In some embodiments, the ornament locking portion includes a latch portion and a stem portion, wherein the stem portion interconnects the annuloid portion with the latch portion. Preferably, the ornament portion has a flat back side, wherein the attachment interface locking portion includes a locking ring saddle, having an upper surface, that is securely extended away from the flat back, generally perpendicular thereto. An elongated inner opening, having a narrower dimension and an elongated dimension, is formed inside the locking ring saddle, the elongated dimension being generally parallel to the back side.

In some embodiments, in which embodiments the ornament locking portion includes a latch portion and a stem portion, the stem portion interconnects the annuloid portion with the latch portion, wherein the stem portion width is sized to be smaller than the narrower dimension of the inner opening of the locking ring saddle. The latch portion extends away from both sides of the stem portion, forming an elongated latch rib, wherein the elongated latch portion is substantially perpendicular to the axis of the inner opening of the annuloid portion, and wherein the elongated latch portion is configured to be inserted into and through the inner opening of the locking ring saddle. A niche formed in the flat back allows the elongated latch portion to be rotatably inserted therein, wherein a bench that is aligned with the upper surface of locking ring saddle, is formed inside the niche.

Upon inserting the elongated latch portion through the inner opening of the locking ring saddle and the stem portion is accommodated inside the inner opening of the locking ring saddle, the temple attaching device is rotated about the stem portion such that the inner opening of the annuloid portion moves away from the flat back until the axis is substantially parallel to the flat back, such that a first side of the latch portion leans on the upper surface of the locking ring saddle, and a second side of the latch portion leans on the bench, bringing the assembled temple ornamentation kit into a locked state.

In some embodiments, in which embodiments the ornament locking portion includes a latch portion and a stem portion, wherein the stem portion interconnects the annuloid portion with the latch portion, and wherein the stem portion is sized to be smaller than the narrower dimension of the inner opening of the locking ring saddle, the latch portion extends away from the stem portion in a first direction, forming an elongated latch rib, wherein the elongated latch portion is substantially perpendicular to the axis of the inner opening of the annuloid portion, and wherein the elongated latch portion is configured to be inserted into and through the inner opening of the locking ring saddle.

In such embodiments, upon inserting the elongated latch portion through the inner opening of the locking ring saddle and the stem portion is accommodated inside the inner opening of the locking ring saddle, the temple attaching device is rotated about the stem portion such that the inner opening of the annuloid portion moves away from the flat back until the axis is substantially parallel to the flat back, such that the latch portion leans on the upper surface of the locking ring saddle, bringing the assembled temple ornamentation kit into a locked state.

Preferably, the temple attaching device includes a flat front side, wherein upon reaching the locked state, wherein the flat front leans on the flat back or is proximal thereto.

In some other embodiments, the ornament portion has a flat back side, wherein the attachment interface locking portion includes a locking ring saddle, having an upper surface, that is securely extended away from the flat back, generally perpendicular thereto.

In some variations of such other embodiments, the ornament locking portion includes a latch portion and a stem portion, wherein the stem portion interconnects the annuloid portion with the latch portion, and the stem portion width is sized to be smaller than the smallest dimension of the inner opening of the locking ring saddle. The latch portion is shaped like a pileus of a mushroom that extends away from all sides of the stem portion forming a flat peripheral surface that is generally parallel to the upper surface of the locking ring saddle, wherein the latch portion is configured to be inserted into and through the inner opening of the locking ring saddle.

Upon inserting the latch portion through the inner opening of the locking ring saddle and the stem portion is accommodated inside the inner opening of locking ring saddle, such that the flat peripheral surface leans on the upper surface of the locking ring saddle, bringing the assembled temple ornamentation kit into a locked state.

Optionally, the ornament locking portion includes a latch portion and a stem portion, wherein the stem portion interconnects the annuloid portion with the latch portion, and wherein the stem portion width is sized to be smaller than the smallest dimension of the inner opening of the locking ring saddle. The latch portion is shaped like a pileus of a mushroom that extends away from all sides of the stem portion forming a flat peripheral surface that is generally parallel to the upper surface of the locking ring saddle, wherein the latch portion is configured to be inserted into and through the inner opening of the locking ring saddle. A niche formed in the flat back to allow the latch portion to be rotatably inserted therein, wherein a bench that is aligned with the upper surface of locking ring saddle, is formed inside the niche.

Upon inserting the latch portion through the inner opening of the locking ring saddle and the stem portion is accommodated inside the inner opening of locking ring saddle, such that the flat peripheral surface leans on the upper surface of the locking ring saddle, bringing the assembled temple ornamentation kit into a locked state and over the bench.

In some variations, the ornament locking portion includes a latch portion and a stem portion having a generally vertical external surface, wherein the stem portion interconnects the annuloid portion with the latch portion, and wherein the stem portion width is sized to be smaller than the smallest dimension of the inner opening of the locking ring saddle. The latch portion is shaped like a pileus of a mushroom and extends away from some of the external surface of the stem portion, forming a flat partial peripheral surface that is generally parallel to the upper surface of the locking ring saddle, wherein the latch portion is configured to be inserted into and through the inner opening of the locking ring saddle.

Upon inserting the latch portion through the inner opening of the locking ring saddle and the stem portion is accommodated inside the inner opening of locking ring saddle, such that the flat peripheral surface leans on the upper surface of the locking ring saddle, bringing the assembled temple ornamentation kit into a locked state.

The temple attaching device may include a flat front side, wherein upon reaching the locked state, wherein the flat front leans on the flat back or is proximal thereto, and wherein the flat partial peripheral surface does not extend away from the external surface of the stem portion, beyond the flat back.

In yet some other embodiments, the ornamental article includes an ornament body and at least one attaching pin having an open end and extending from a flat rear side of the ornament body, substantially perpendicular thereto. Each of the attaching pins includes a narrower section, proximal to the flat rear side of the ornament body, and a wider section extending from the narrower section towards the open end of the attaching pin, wherein the wider section is wider than the narrower section. The annuloid portion includes a body having a first elasticity, wherein the ornament locking portion includes a body having a second elasticity, and wherein the first elasticity is higher than the second elasticity. The ornament locking portion is securely attached to the annuloid portion at the front side, wherein the front external surface of the ornament locking portion is a flat front surface. At least one receiving bore is formed in the flat front surface extending through the ornament locking portion and reaching into the annuloid portion, wherein the at least one receiving bore is sized to receive the attaching pin.

Upon inserting the attaching pin into a respective receiving bore, the attaching pin is pushed through the ornament locking portion and into the annuloid portion. The section of the receiving bore in the ornament locking portion is configured to accommodate the narrower section of the attaching pin, wherein the section of the receiving bore in the annuloid portion is configured to accommodate the wider section of the attaching pin. The ornament locking portion, being less elastic than the annuloid portion, serves as a stopper to the wider pin section being accommodated inside the ornament locking portion, bringing the assembled temple ornamentation kit into a locked state.

Optionally, upon utilizing more than one of the attaching pins, all of the attaching pins are parallel to each other.

Optionally, the attaching pins are not perpendicular to the flat rear side of the ornament body.

BRIEF DESCRIPTION OF THE DRAWINGS

The present invention will become fully understood from the detailed description given herein below and the accompanying drawings, which are given by way of illustration and example only, and thus not limiting in any way, wherein:

FIG. 1a (prior art) depicts an example pair of eyeglasses.

FIG. 1b (prior art) depicts an example front of a pair of eyeglasses.

FIG. 1c (prior art) depicts an example temple of a pair of eyeglasses.

FIG. 2a (prior art) illustrates another example of temple for eyeglasses.

FIG. 2b (prior art) illustrates another example of temple for eyeglasses.

FIG. 2c (prior art) illustrates another example of temple for eyeglasses.

FIG. 2d (prior art) illustrates another example of temple for eyeglasses.

FIG. 4a is a side perspective view illustration of the temple attaching device, as shown in FIG. 3a, wherein the temple attaching device is configured to grasp onto the temple of the eyeglasses at a selected location.

FIG. 4b is a side perspective view illustration of an example ornamental article having a flat back side, wherein an annuloid cam is securely extended away from the flat back, generally perpendicular thereto, as also shown in FIG. 3a.

FIG. 8a is a cross section AA' of the temple ornamentation kit as shown in FIG. 6.

FIG. 8b is a cross section BB' of the temple ornamentation kit as shown in FIG. 7.

FIG. 9 is a cross section of another example of a temple ornamentation kit, being a variation of the temple ornamentation kit shown in FIG. 8b.

FIG. 12a is shown in a top-side perspective view of the unassembled temple-ornamentation kit; and FIG. 12b is shown in a bottom perspective view of the unassembled temple-ornamentation kit.

FIG. 15b is an example of an ornamental article, configured to be attached to temple attaching devices, as shown in FIGS. 15a and 16a.

FIG. 15c is a cross section CC' of the temple attaching device as shown in FIG. 15a.

FIG. 16b is a cross section DD' of the temple attaching device as shown in FIG. 16a.

DETAILED DESCRIPTION OF THE INVENTION

Figures 3A, 3B:
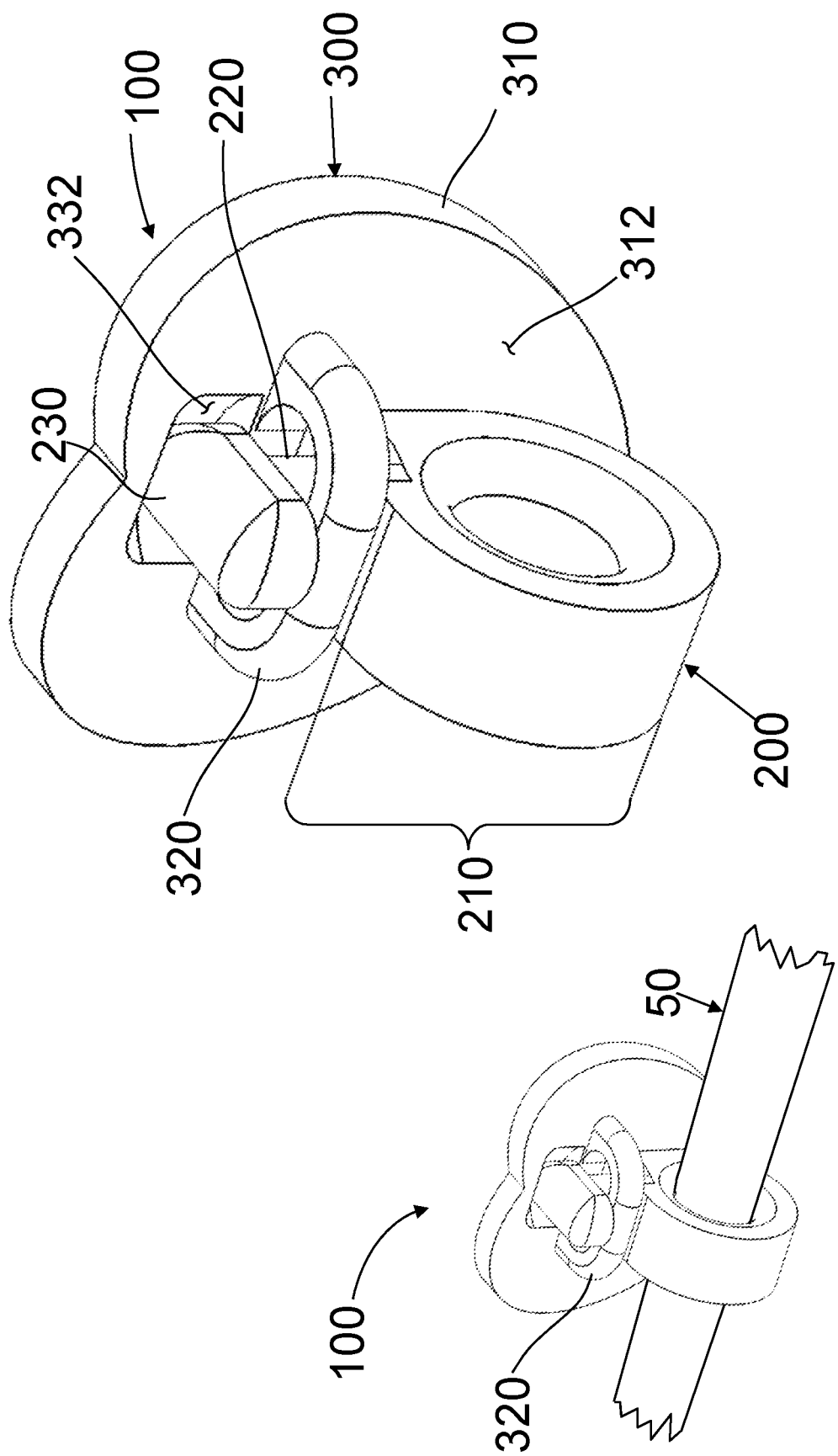
FIG. 3a illustrates an assembled example of a temple ornamentation kit for eyeglasses, according to some embodiments of the present invention.
FIG. 3b illustrates an assembled example of a temple ornamentation kit for eyeglasses, as shown in FIG. 3a, wherein the assembled temple ornamentation kit is assembled onto a temple of eyeglasses.

Before explaining embodiments of the invention in detail, it is to be understood that the invention is not limited in its application to the details of construction and the arrangement of the components set forth in the host description or illustrated in the drawings.

An embodiment is an example or implementation of the inventions. The various appearances of "one embodiment", "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "top", "bottom", "horizontal", "vertical" "up", "upper", "down", "low", "lower" and the like, assumes that the eyeglasses are worn by a person, wherein his/her head is in an upright posture.

Reference is made to the drawings. FIGS. 3a and 3b illustrates one embodiment of an example temple-ornamentation kit 100 for eyeglasses, according to embodiments of the present invention, temple-ornamentation kit 100 being in an assembled state. Temple-ornamentation kit 100 includes a temple attaching device 200 and an ornamental article 300. FIG. 4a is a side perspective view illustration of temple attaching device 200, wherein temple attaching device 200 is configured to grasp onto the temple (40) of the eyeglasses (50) at a selected location. FIG. 4b is a side perspective view illustration of ornamental article 300 having a flat back side 312, wherein a locking ring saddle 320 is securely extended away from flat back 312, generally perpendicular thereto. An elongated inner opening 322 is formed inside locking ring saddle 320. The orientation of a locking ring saddle 320 includes a lower surface (323) that is generally horizontal and generally parallel to the upper edge of a respective temple (40) of the eyeglasses (50), as shown in FIG. 3b.

Temple attaching device 200 is made of elastic materials and includes a latch portion 230 and an annuloid portion 210 that are interconnected by a stem portion 220. The annuloid portion 210 has an enclosed inner opening 214. The stem portion 220 is sized to be smaller than the narrower dimension of inner opening 322 of locking ring saddle 320. Latch portion 230 is configured to be inserted into and through the inner opening 322 of locking ring saddle 320 of ornamental article 300 and lock there onto. Latch portion 230, being secured at one end of stem portion 220, preferably perpendicular thereto. Latch portion 230 extends away from both sides of stem portion 220, forming an elongated latch, wherein the elongated latch portion 230 is substantially perpendicular to the axis 215 of inner opening 214 of annuloid portion 210.

The annuloid portion 210, being for example circular or oval, is configured to allow a temple (40) of the eyeglasses (50) to be inserted there through, wherein the inner opening 214 of annuloid portion 210 is sized to grip the temple (40) at a selected location.

Optionally, a niche 330 is formed in flat back 312 to allow latch portion 230 to be rotatably inserted therein, wherein a bench 334 that is aligned with the upper surface 324 of locking ring saddle 320, is formed inside niche 330. Optionally, niche 330 is formed in alignment with the lower surface of locking ring saddle 320.

Figure 5:
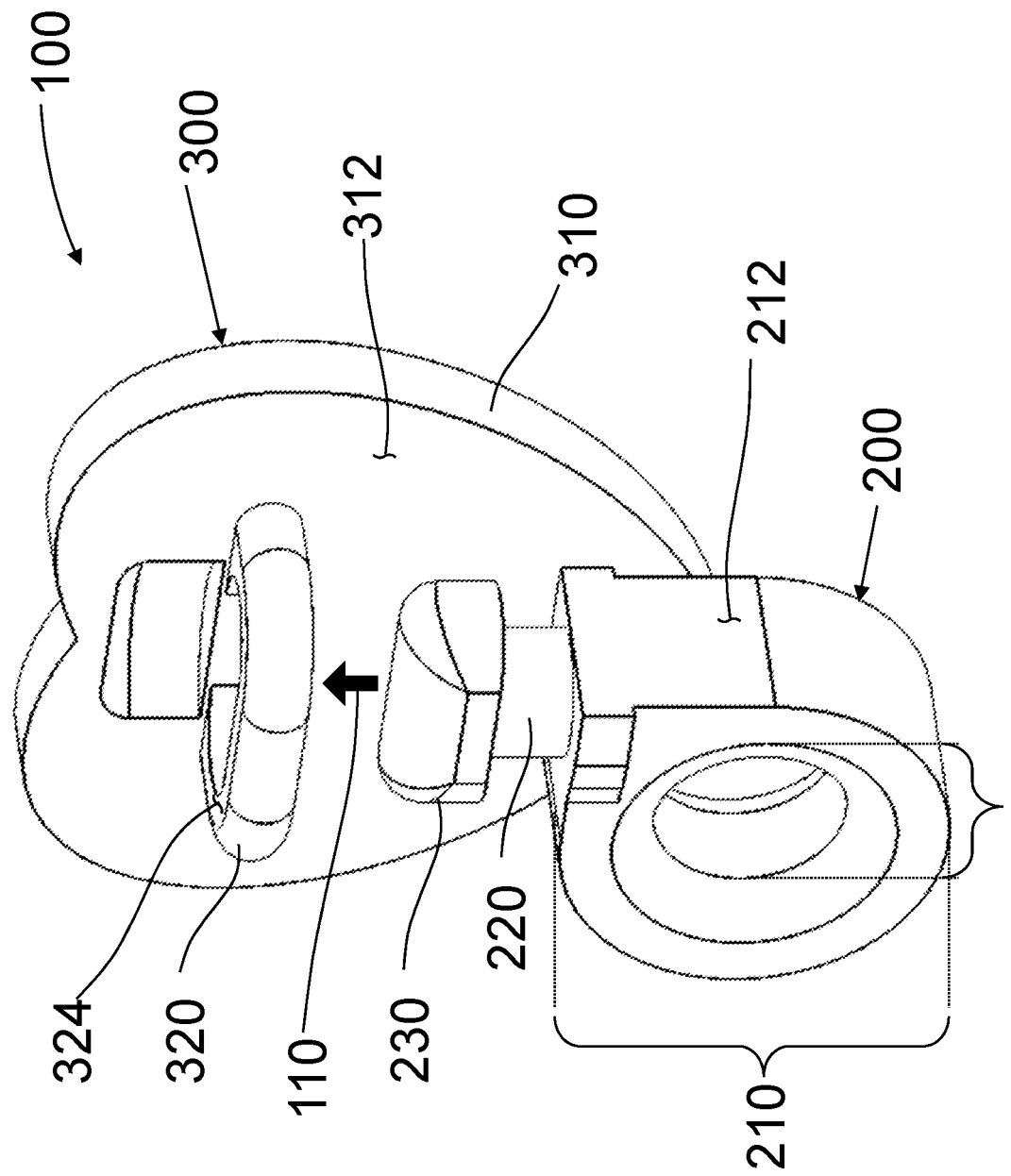
FIG. 5 illustrates the insertion step of the temple attaching device shown in FIG. 4a into the locking ring saddle shown in FIG. 4b.

Reference is also made to FIG. 5, illustrating the insertion step of latch portion 230 into the locking ring saddle 320. Temple attaching device 200 is placed below ornamental article 300 such that the orientation of latch portion 230 is to fit into inner opening 322 of locking ring saddle 320 of ornamental article 300, when moved in direction 110. The elongated latch portion 230 is substantially parallel to flat back side 312 of ornamental article 300, and is generally aligned with the elongated inner opening 322 of locking ring saddle 320.

Figure 6:
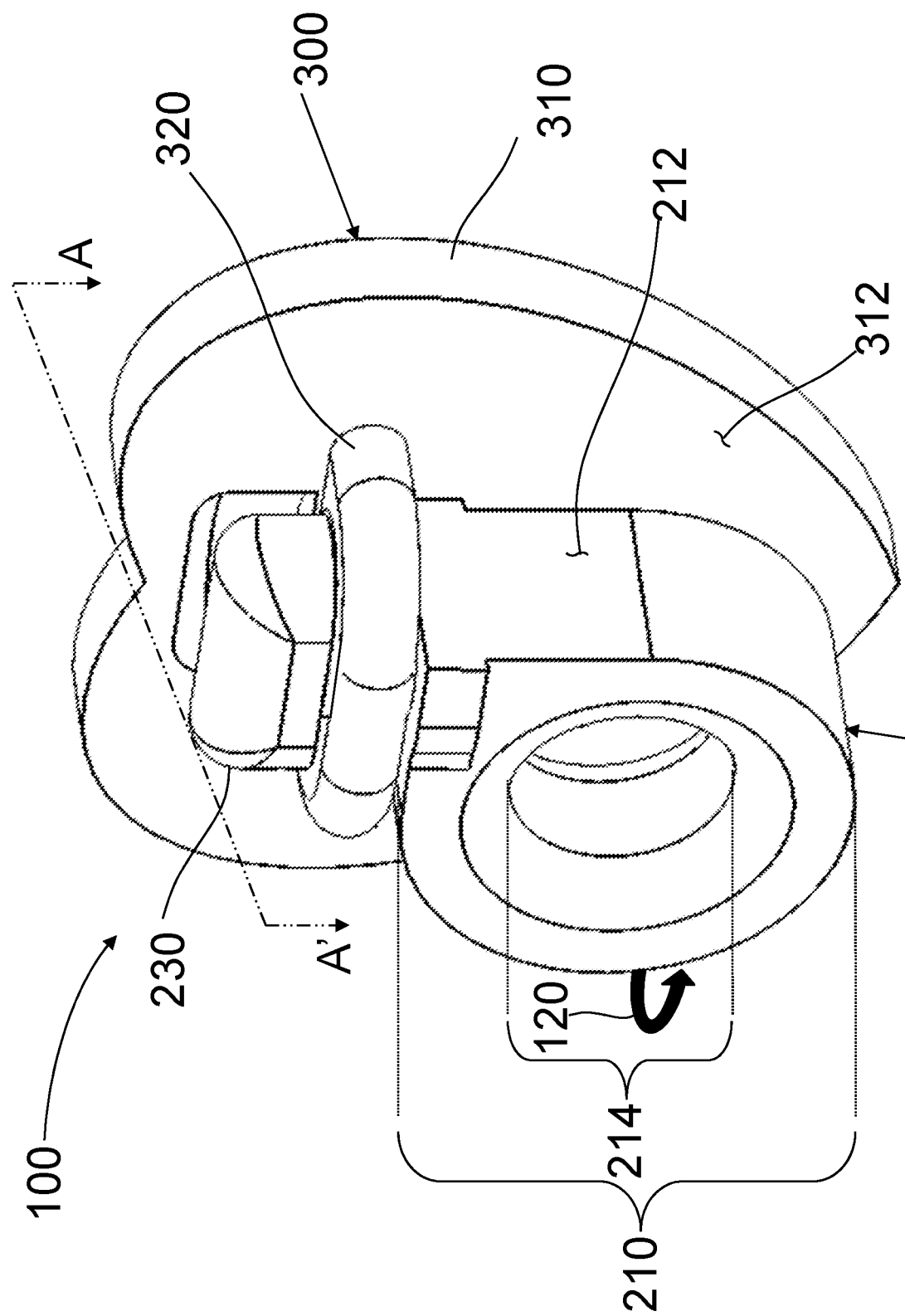
FIG. 6 illustrates the temple ornamentation kit after the temple attaching device has been inserted into the locking ring saddle.
Figure 7:
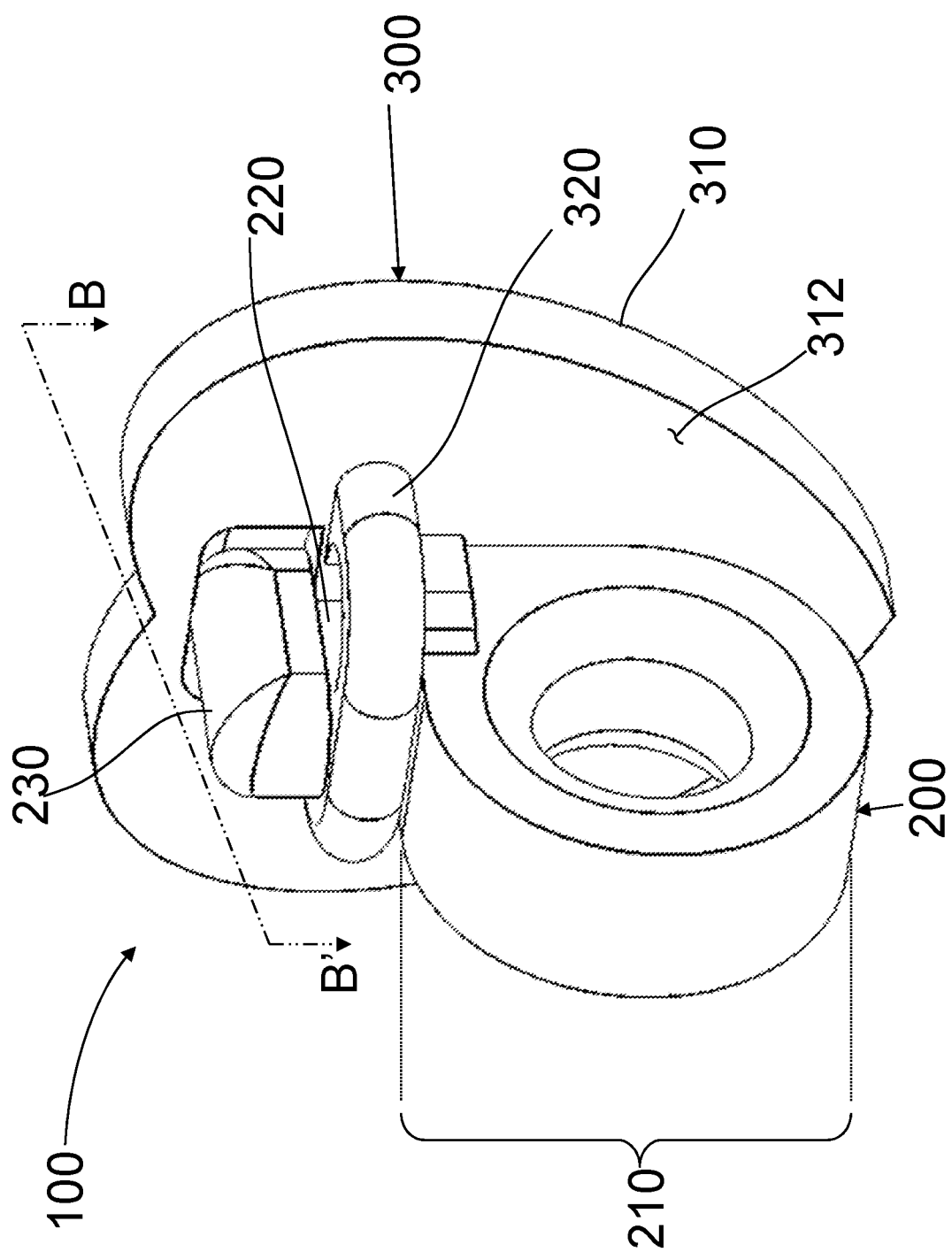
FIG. 7 illustrates the temple ornamentation kit after the temple attaching device has been rotated into a lock state.

FIG. 6 illustrates the state in which latch portion 230 has been inserted through locking ring saddle 320 of ornamental article 300, wherein stem portion 220 is accommodated inside inner opening 322 of locking ring saddle 320. At this assembly point, temple attaching device 200 is rotated about the axis of stem portion 220, in direction 120, such that latch portion 230 leans on upper surface 324 of locking ring saddle 320 and optionally, on bench 334. FIG. 7 illustrates the assembled temple ornamentation kit 100, after temple attaching device 200 has been rotated into a locked state, in which latch portion 230 leans on upper surface 324 of locking ring saddle 320 and on a bench 334. The flat back 212 of attaching device 200 provides further locking stability, leaning on flat back side 312 of ornamental article 300.

Reference is also made to FIG. 8a, a cross section AA' of temple ornamentation kit 100, as shown in FIG. 6; and to FIG. 8b, a cross section BB' of temple ornamentation kit 100, as shown in FIG. 7. Once temple ornamentation kit 100 is in the locked state, a temple (40) of eyeglasses (50) may be inserted through the inner opening 214 of annuloid portion 210, wherein inner opening 214 is preferably sized to grip the temple (40) at a selected location.

It should be noted that the example embodiment of temple ornamentation kit 100 may be varied in many ways. However, it will be appreciated that such variations are not to be regarded as a departure from the spirit and scope of the invention, and all such modifications as would be obvious to one skilled in the art are contemplated. For example, with reference to FIG. 9, a cross section of an example variation temple ornamentation kit 101 of a temple ornamentation kit 100 (see FIG. 8b). Ornamental article 301 does not have a niche 330 and is formed in flat back 312, as in ornamental article 300, and while latch portion 230 of temple attaching device 200 has two arms: a first arm is lockingly leaning on upper surface 324 of locking ring saddle 320; and the other arm is lockingly leaning on bench 334, latch portion 231 of temple attaching device 201 has just one arm that is lockingly leaning on upper surface 324. The flat back of attaching device 201 (corresponding to flat back 212 of attaching device 200) provides the needed locking stability, by leaning on flat back side 312 of ornamental article 301.

Figure 10:
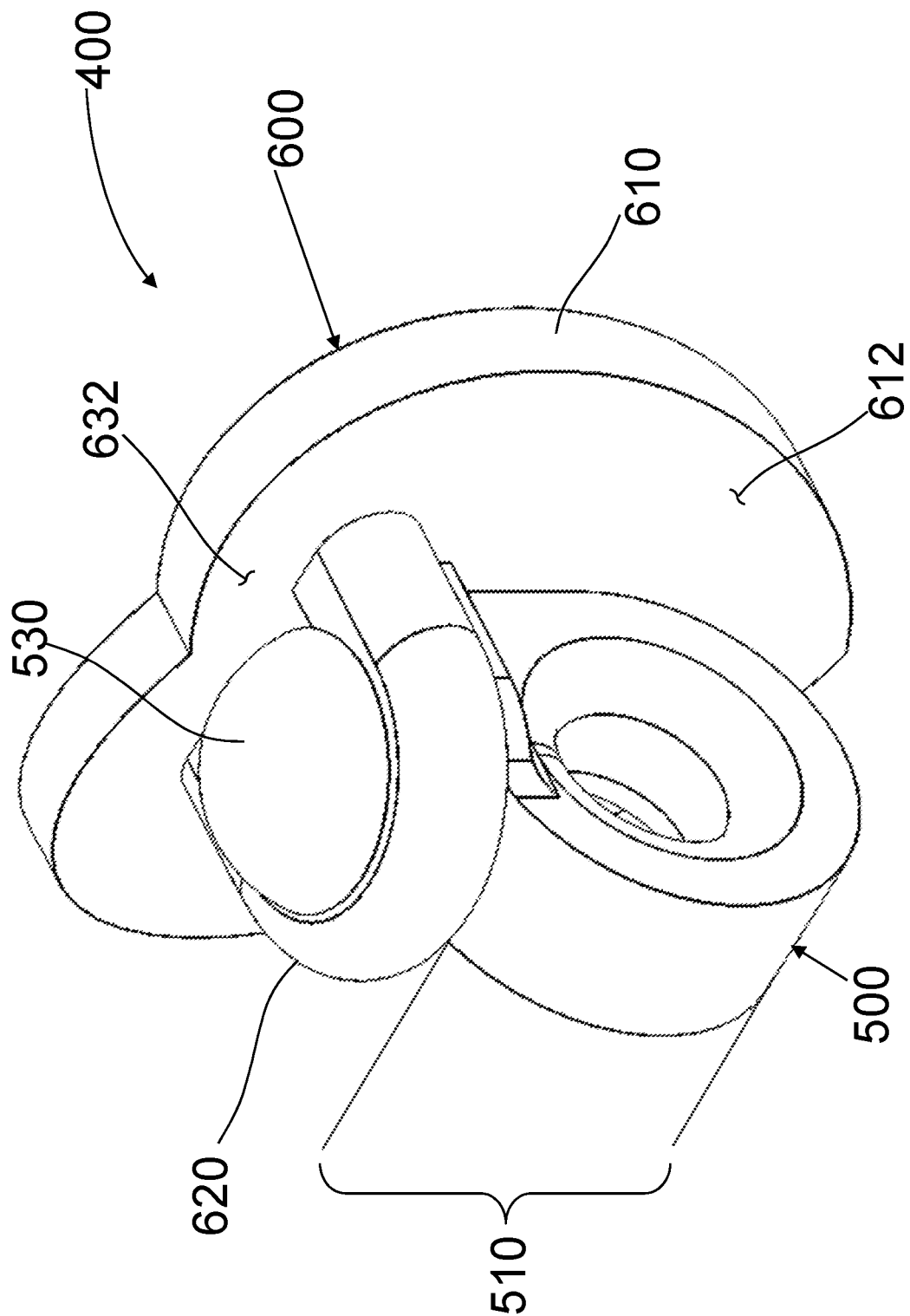
FIG. 10 illustrates an assembled exemplary of another temple ornamentation kit for eyeglasses, according to some other embodiments of the present invention.
Figure 11B:
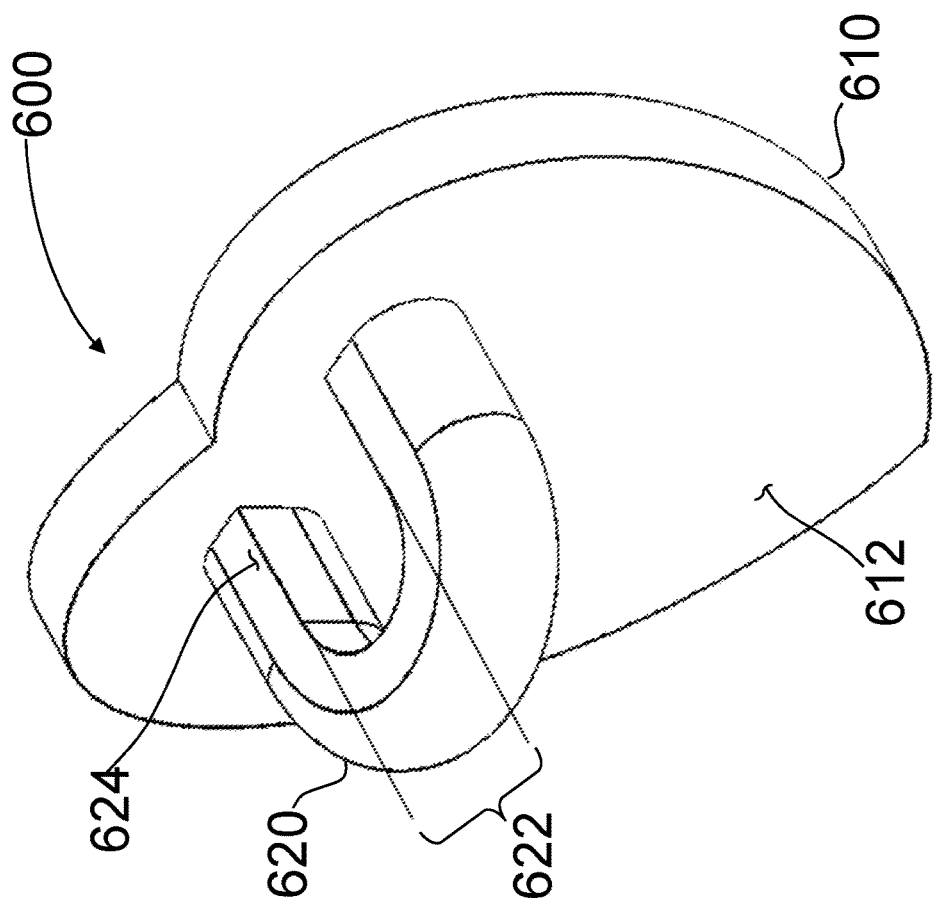
FIG. 11b is a side-top perspective view illustration of an example ornamental article having a flat back side, wherein an annular semi-oval cam is securely extended away from the flat back, generally perpendicular thereto, as also shown in FIG. 10.
Figure 11A:
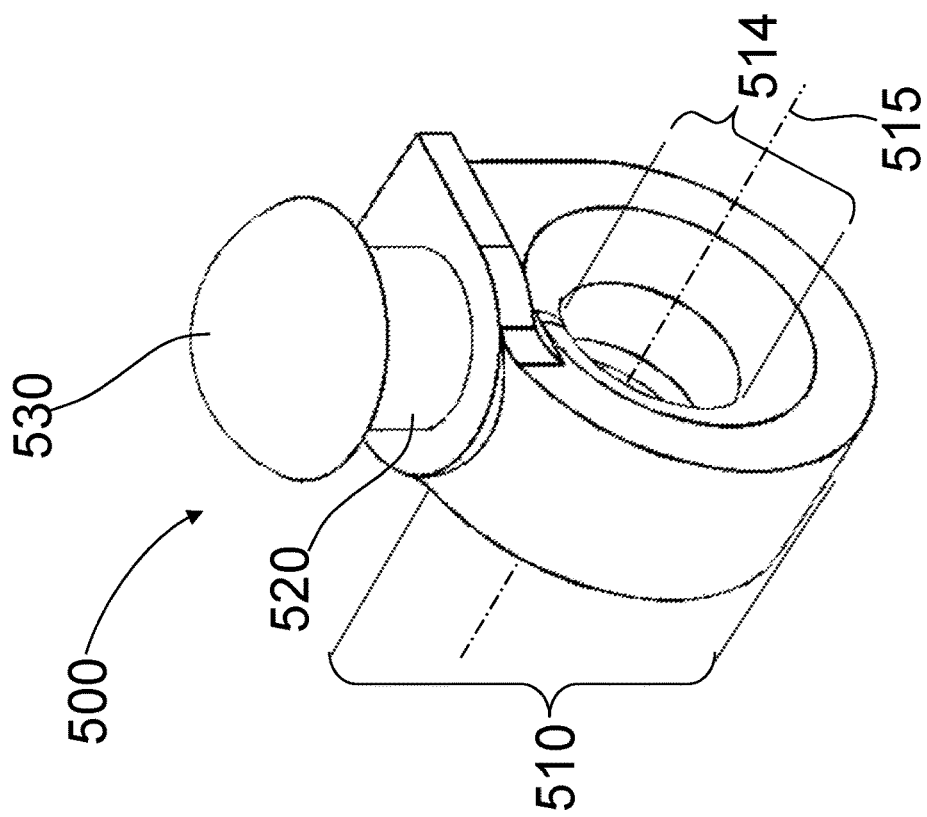
FIG. 11a is a side-top perspective view illustration of the temple attaching device, as shown in FIG. 10, wherein the temple attaching device is configured to grasp onto the temple of the eyeglasses at a selected location.

Reference is made to the drawings. FIG. 10 illustrates another embodiment of an example temple-ornamentation kit 400 for eyeglasses, according to embodiments of the present invention, temple-ornamentation kit 400 being in an assembled state. Temple-ornamentation kit 400 includes a temple attaching device 500 and an ornamental article 600. FIG. 11a is a side-top perspective view illustration of temple attaching device 500, wherein temple attaching device 500 is configured to grasp onto the temple (40) of the eyeglasses (50) at a selected location. FIG. 11b is a side-top perspective view illustration of ornamental article 600 having a flat back side 612, wherein a locking ring saddle 620 is securely extended away from flat back 612, generally perpendicular thereto. The orientation of a locking ring saddle 620 includes a lower surface 623 that is generally horizontal and generally parallel to the upper edge of a respective temple (40) of the eyeglasses (50), as shown in FIG. 12b. Typically, locking ring saddle 620 is made of rigid materials.

Temple attaching device 500 is made of elastic materials and includes a latch portion 530 and annuloid portion 510 that are interconnected by a stem portion 520. Latch portion 530 and stem portion 520 form, with no limitations, a mushroom like shape. The stem portion 520 width is sized to be smaller than the inner opening of locking ring saddle 620. The latch portion 530 is configured to be pushed through the inner opening of locking ring saddle 620 of ornamental article 600 and lock there onto. The annuloid portion 510, being for example circular or oval, is configured to allow a temple (40) of the eyeglasses (50) to be inserted there through, wherein the inner opening 514 of annuloid portion 510 is sized to grip the temple (40) at a selected location.

Figure 12A:
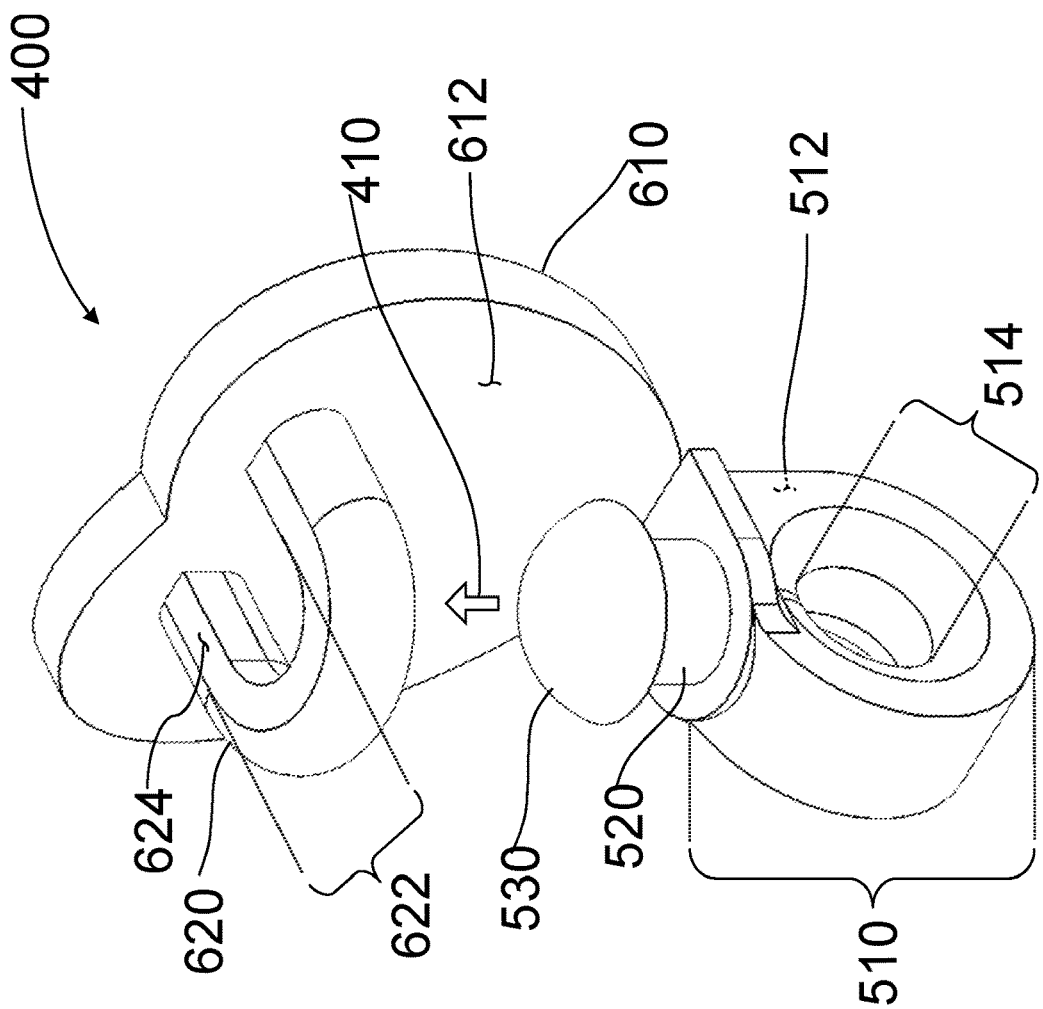
FIGS. 12a and 12b illustrate the insertion step of the temple attaching device shown in FIG. 11a into the locking ring saddle shown in FIG. 11b.
Figure 12B:
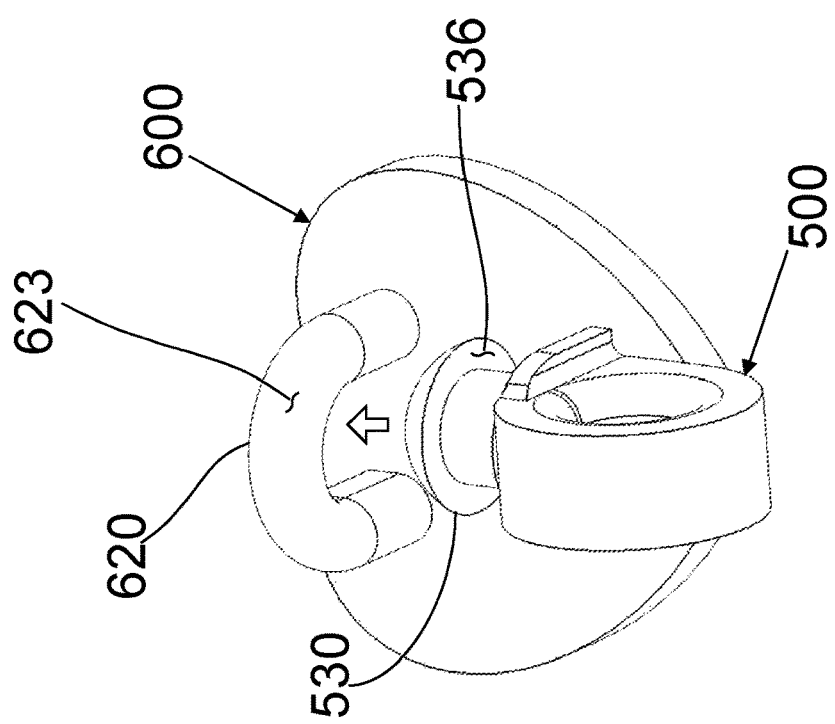
Figure 13:
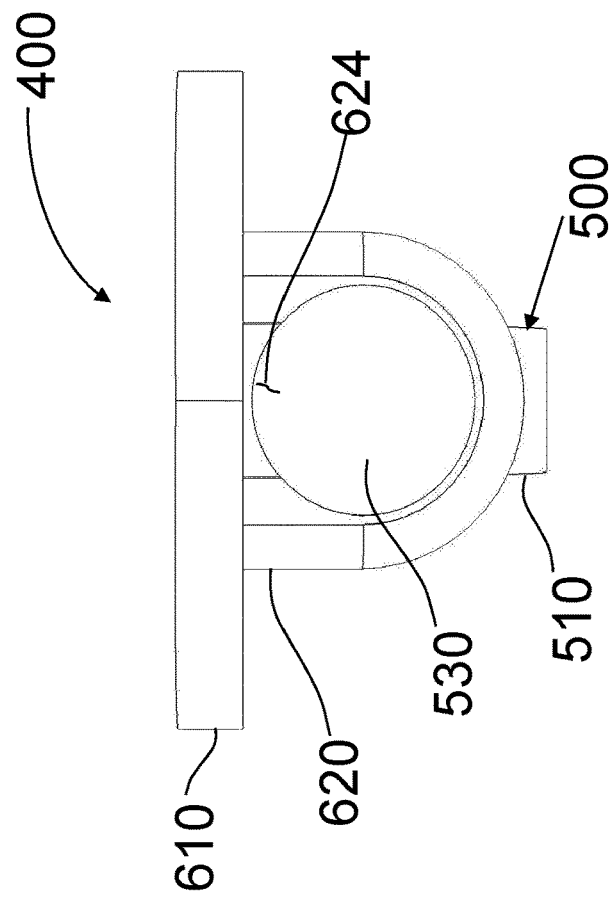
FIG. 13 is a top view of the temple ornamentation kit shown in FIG. 10.

Reference is also made to FIGS. 12a and 12b, illustrating the insertion step of latch portion 530 into the locking ring saddle 620. Temple attaching device 500 is placed below ornamental article 600, moved in direction 410 such that the elastic latch portion 530 is pushed through locking ring saddle 620 of ornamental article 600. FIG. 10 illustrates the state in which latch portion 530 has been pushed through locking ring saddle 620 of ornamental article 600, and outskirts 536 (see FIG. 12b) are lockingly resting on the upper surface 624 of locking ring saddle 620. The flat back 512 of attaching device 500 provides further locking stability, leaning on flat back side 612 of ornamental article 600.

Figure 14:
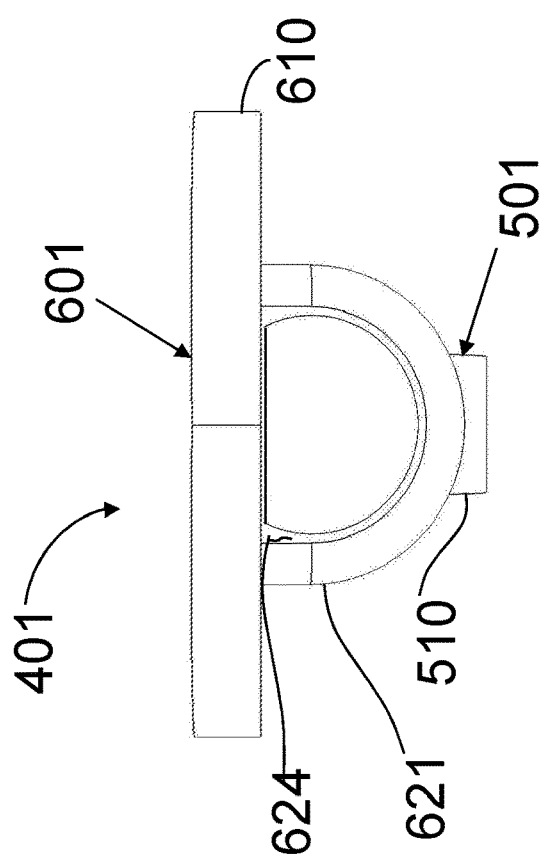
FIG. 14 is a top view of another example of a temple ornamentation kit, being a variation of the temple ornamentation kit shown in FIG. 10.

It should be noted that the example embodiment of temple ornamentation kit 400 may be varied in many ways. However, it will be appreciated that such variations are not to be regarded as a departure from the spirit and scope of the invention, and all such modifications as would be obvious to one skilled in the art are contemplated. For example, with reference to FIGS. 10-12b, the latch portion 530 of attaching device 500 is shown, with no limitations, as a circular mushroom head, which may also be shaped differently, for example oval. FIG. 14 illustrates a top view of another example temple ornamentation kit 401, being a variation of temple ornamentation kit shown 400, as shown in FIG. 10. Temple-ornamentation kit 400 includes a temple attaching device 501 and an ornamental article 601.

The latch portion 531 of temple attaching device 501 is shown, with no limitations, as a circular mushroom head that is truncated on the side facing flat back side 612 of ornamental article 601, when assembled. Therefore, the inner opening of locking ring saddle 621 of ornamental article 601 may be reduced in size, as well as the locking ring saddle 621 itself, wherein the extension of locking ring saddle 621 from flat back side 612 is lessened. The flat back of attaching device 501 (corresponding to flat back 512 of attaching device 500) provides the needed locking stability, by leaning on flat back side 612 of ornamental article 601. The orientation of a locking ring saddle 621 includes a lower surface that is generally horizontal and generally parallel to the upper edge of a respective temple (40) of the eyeglasses (50), as is locking ring saddle 620. Typically, locking ring saddle 621 is made of rigid materials.

Optionally, ornamental article 600 may have a niche, similar to niche 330 of ornamental article 600, wherein part of the outskirts 536 of latch portion 530 may lean on the bench, similar to bench 334 of niche 330, that is formed inside the niche in flat back 612.

Figure 15A:
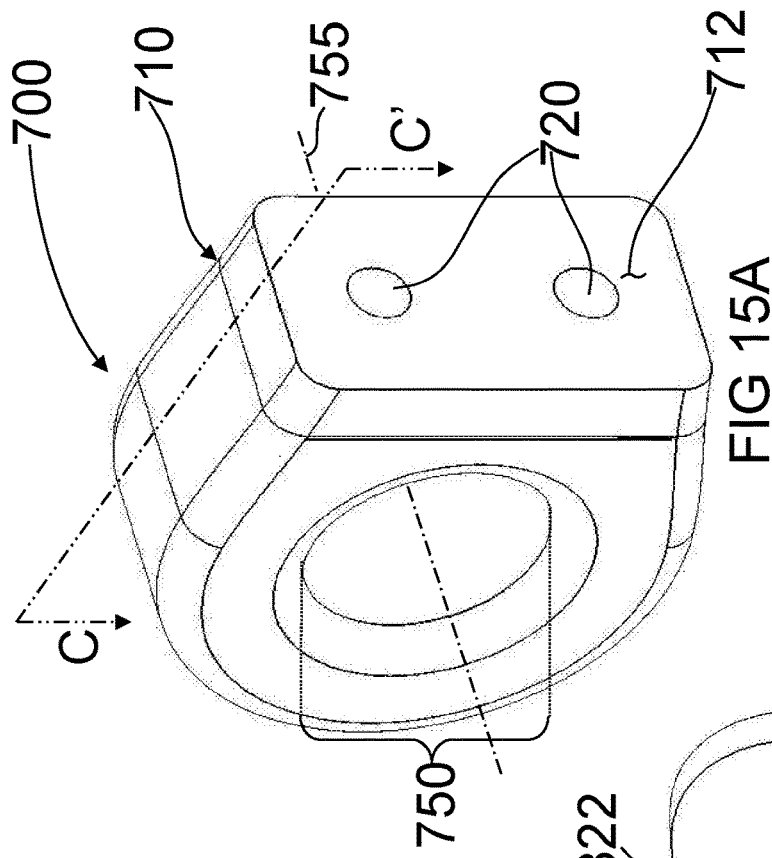
FIG. 15a, illustrates another example of a temple attaching device, according to some other embodiments of the present invention, having a circular opening.
Figure 15B:
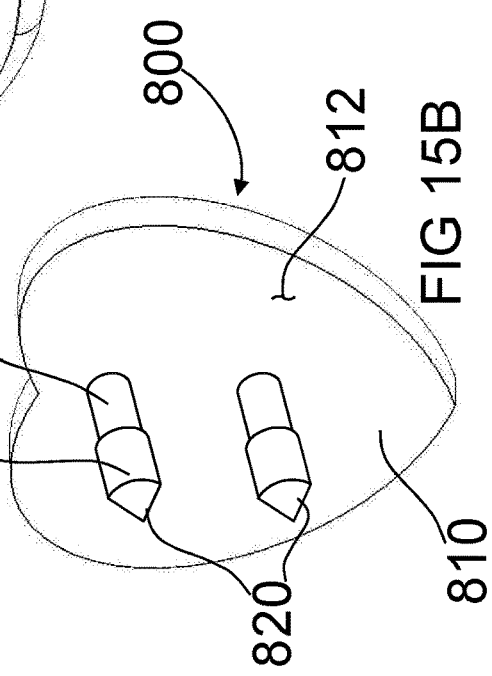

Reference is now made to FIG. 15a, illustrating another exemplary temple attaching device 700, according to some other embodiments of the present invention, having a circular opening 750. FIG. 15b is an example of an ornamental article 800, configured to be attached to temple attaching device 700. Ornamental article 800 includes an ornament body 810, and at least one attaching pin 820 extending from the generally flat rear side 812 of ornament body 810. Preferably, attaching pin 820 includes a narrower section 822, proximal to flat rear side 812 of ornament body 810, and a wider section 824 extending from narrower section 822 towards the open end of attaching pin 820. Preferably, wider section 824 is wider than narrower section 822.

Figure 15C:
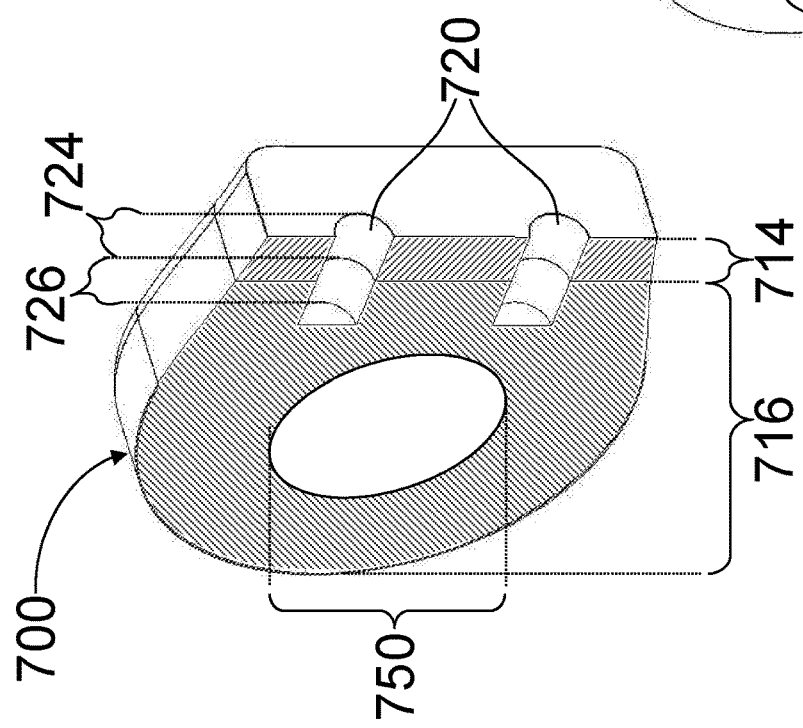
Figure 16B:
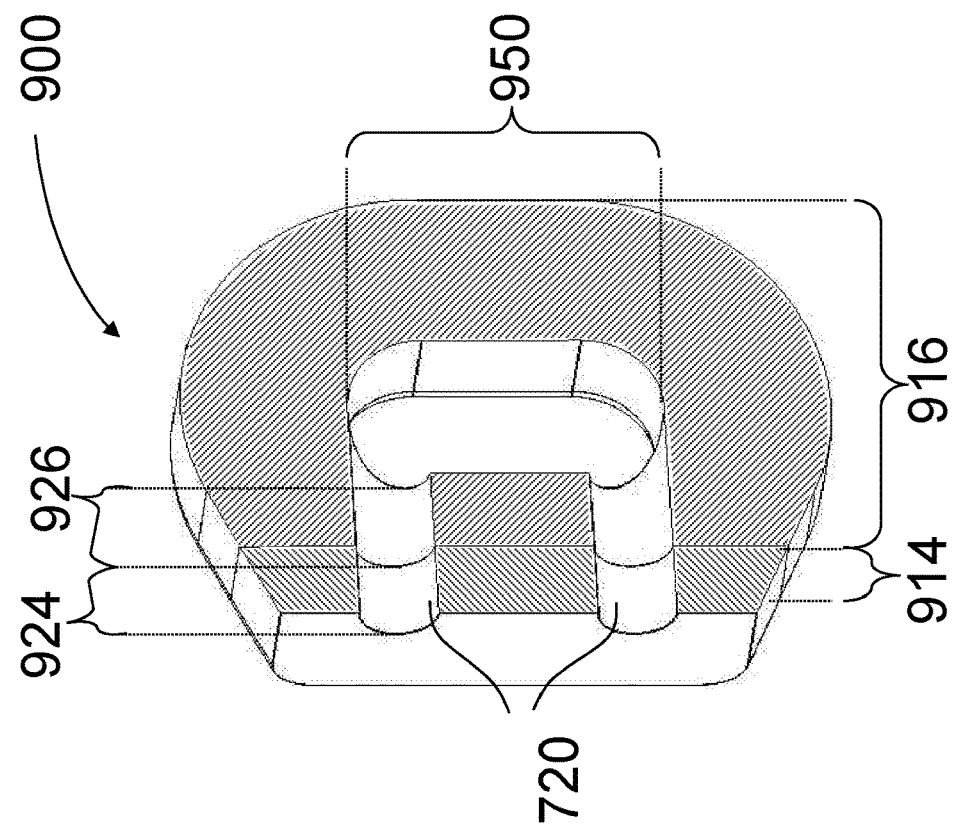
Figure 16A:
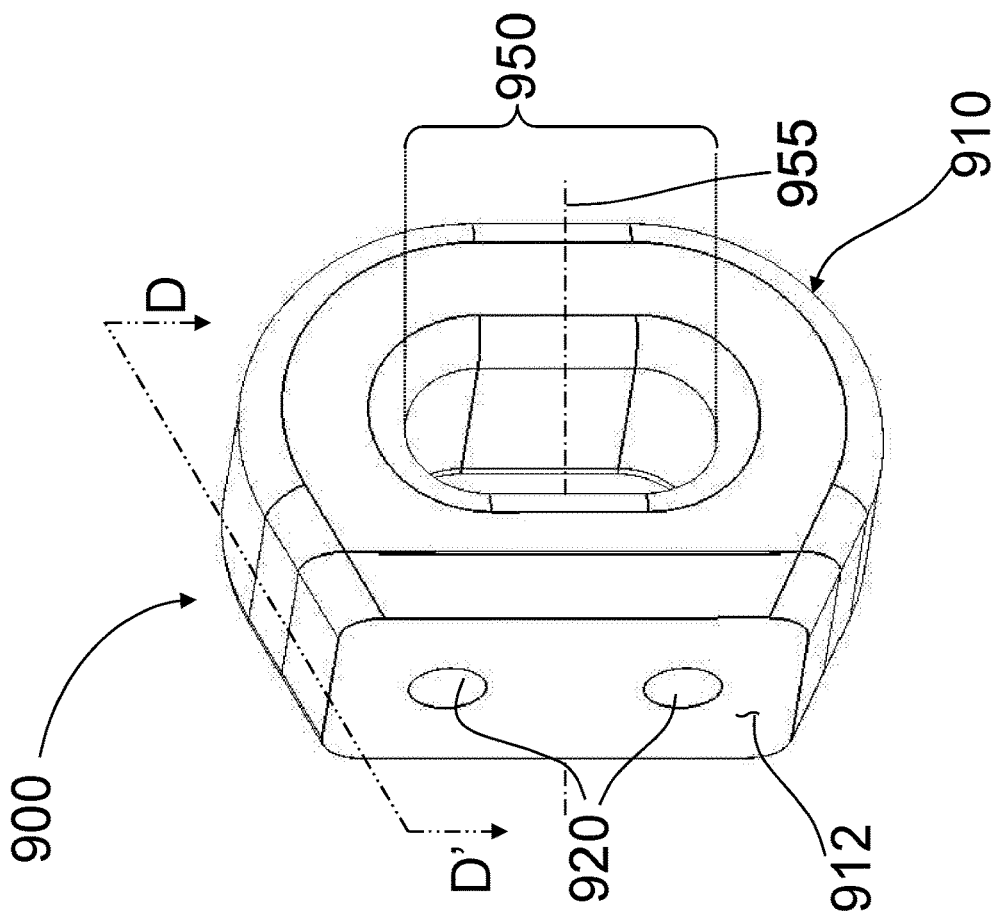
FIG. 16a, illustrates another example of a temple attaching device, according to some other embodiments of the present invention, having an oval opening.

Temple attaching device 700 includes an annuloid body 710 made of elastic materials. An opening 750 is formed in annuloid body 710, wherein opening 750 is sized to grip a temple (40) at a selected location. In the example shown in FIG. 15a, opening 750 is circular. In the example shown in FIG. 16a, opening 950 is oval. Other than that, temple attaching device 900 shown in FIG. 16a, is similar to temple attaching device 700. FIG. 15c is a cross section CC' of the temple attaching device 700; and FIG. 16b is a cross section DD' of the temple attaching device 900.

At the peripheral side of annuloid body 710 (or 910) the surface may take any shape, except for one, general flat surface 712 (or 912). At least one receiving bore 720 (or 920) is formed in flat surface 712 (or 912), wherein receiving bore 720 (or 920) is sized to receive attaching pin 820. If ornamental article 800 includes more than one attaching pin 820, then a respective receiving bore 720 (or 920) is formed in flat surface 712 (or 912), wherein receiving bores 720 (or 920) are spaced apart such as to receive all attaching pins 820.

Preferably, the elasticity of annuloid body 710 (or 910) is not uniform: a first body section 714 (or 914) that extends from flat surface 712 (or 912) and contain a first bore portion 724 (or 924), which first bore portion 724 (or 924) is configured to contain narrower section 822; and a second body section 716 (or 916) that extends from flat surface 712 (or 912) and contain a second bore portion 726 (or 926), which second bore portion 726 (or 926) is configured to contain wider section 824. Preferably, second body section 716 (or 916) is more elastic than first body section 714 (or 914). Therefore, second bore portion 726 (or 926) is configured to contain wider section 824, while the more rigid first bore portion 724 (or 924) is configured to serve as a stopper to wider pin section 824, to thereby prevent ornamental article 800 from accidentally falling out of temple attaching device 700 (or 900).

It should be noted that attaching pins 820 may not be perpendicular to flat rear 812 side of the ornament body (710, 910), however, all attaching pins 820 must be parallel to each other.

It should be noted that a "front" orientation of an ornamental article (300, 301, 600, 601, 800) assumes that the ornamental side of the ornamental article is facing away from the other temple (40). Similarly, "back/rear" orientation of an ornamental article (300, 301, 600, 601, 800) assumes that the rear side of the ornamental article is facing the other temple (40).

The present invention being thus described in terms of several embodiments and examples, it will be appreciated that the same may be varied in many ways. Such variations are not to be regarded as a departure from the spirit and scope of the invention, and all such modifications as would be obvious to one skilled in the art are contemplated.

What is claimed is:

1. A temple-ornamentation kit (100, 101, 400, 401, 700) for eyeglasses facilitating attaching an ornamental article to a temple (40) of eyeglasses (50), the temple-ornamentation kit comprising:
   a) a temple attaching device (200, 500, 710) comprising:
      i. an annuloid portion (210, 510, 716) having an enclosed inner opening (214, 514, 750), said inner opening having an axis (215, 515, 755); and
      ii. an ornament locking portion; and b) an ornamental article (300, 301, 600, 601) comprising:
   i. an ornament portion (310, 311, 610) having a flat back (312) side; and
   ii. an attachment interface locking portion having a locking ring saddle (320, 620, 621) extending away from the flat back and perpendicular thereto,
wherein said temple attaching device is a single unit, made of elastic materials;
wherein the temple is operatively passed through said enclosed inner opening of said annuloid portion, and
wherein said enclosed inner opening of said annuloid portion is sized to grip the temple at a selected location;
wherein said ornamental article is a single unit;
wherein said locking ring saddle (320, 620, 621) is configured to interlock with said ornament locking portion.

2. The temple-ornamentation kit of claim 1, wherein said ornament locking portion (200, 201, 5000, 501) comprises a latch portion (230, 231, 530, 531) and a stem portion (220, 520), and wherein said stem portion interconnects said annuloid portion (210) with said latch portion.

3. The temple-ornamentation kit (100, 101) of claim 2, wherein said locking ring saddle (320), has an upper surface (324), that is securely extended away from said flat back, generally perpendicular thereto; and wherein an elongated inner opening (322), having a narrower dimension and an elongated dimension, is formed inside said locking ring saddle, said elongated dimension being generally parallel to said back side.

4. The temple-ornamentation kit (100, 101) of claim 3, wherein said locking ring saddle (320) includes a lower surface (323) and wherein when said ornamental portion is connected via said temple attaching device to said temple, said lower surface (323) is generally horizontal and generally parallel to an upper edge of said temple (40) of the eyeglasses (50).

5. The temple-ornamentation kit (100) of claim 3, wherein a width of said stem portion is sized to be smaller than said narrower dimension of said inner opening of said locking ring saddle; wherein said latch portion extends away from both sides of said stem portion, forming an elongated latch rib, wherein said elongated latch rib is substantially perpendicular to said axis (215) of said inner opening (214) of said annuloid portion, and wherein said elongated latch portion is configured to be inserted into and through said inner opening (322) of said locking ring saddle; and wherein a niche (330) formed in said flat back allows said elongated latch portion to be rotatably inserted therein, and wherein a bench (334) that is aligned with an upper surface of locking ring saddle, is formed inside said niche.

6. The temple-ornamentation kit (100) of claim 5, wherein upon inserting said elongated latch portion through said inner opening of said locking ring saddle and said stem portion is accommodated inside said inner opening of said locking ring saddle, said temple attaching device (200) is rotated about said stem portion such that said inner opening of said annuloid portion moves (120) away from said flat back until said axis (215) is substantially parallel to said flat back, such that a first side of said latch portion leans on said upper surface of said locking ring saddle, and a second side of said latch portion leans on said bench, bringing the temple ornamentation kit (100) into a locked state.

7. The temple-ornamentation kit (101) of claim 3, wherein said latch portion extends away from said stem portion in a first direction, forming an elongated latch rib, wherein said elongated latch rib is substantially perpendicular to said axis (215) of said inner opening (214) of said annuloid portion, and wherein said elongated latch rib is configured to be inserted into and through said inner opening (322) of said locking ring saddle.

8. The temple-ornamentation kit (101) of claim 7, wherein upon inserting said elongated latch rib through said inner opening of said locking ring saddle and said stem portion is accommodated inside said inner opening of said locking ring saddle, said temple attaching device (201) is rotated about said stem portion such that said inner opening of said annuloid portion moves (120) away from said flat back until said axis (215) is substantially parallel to said flat back, such that said latch portion leans on an upper surface of said locking ring saddle, bringing the assembled temple ornamentation kit (101) into a locked state.

9. The temple-ornamentation kit (400, 401) of claim 2, wherein said locking ring saddle (620) is securely extended away from said flat back, generally perpendicular thereto, said locking ring saddle (620) having an upper surface (624) and a lower surface (623).

10. The temple-ornamentation kit (400, 401) of claim 9, wherein when said ornamental portion is connected via said temple attaching device to a respective temple of the eyeglasses, said lower surface (623) is generally horizontal and generally parallel to an upper edge of said respective temple.

11. The temple-ornamentation kit (400) of claim 9, wherein a width of said stem portion is sized to be smaller than a smallest dimension of an inner opening of said locking ring saddle; wherein said latch portion is shaped like a pileus of a mushroom that extends away from all sides of said stem portion forming a flat peripheral surface (536) that is generally parallel to said upper surface of said locking ring saddle, wherein said latch portion is configured to be inserted into and through said inner opening (622) of said locking ring saddle.

12. The temple-ornamentation kit (400) of claim 11, wherein upon inserting said latch portion through said inner opening of said locking ring saddle and said stem portion is accommodated inside said inner opening of said locking ring saddle, such that said flat peripheral surface leans on said upper surface of said locking ring saddle, bringing the temple ornamentation kit (400) into a locked state.

13. The temple-ornamentation kit (400) of claim 9, wherein said latch portion is shaped like a pileus of a mushroom that extends from all sides of said stem portion forming a flat peripheral lower surface (536), wherein said latch portion is configured to be inserted into and through said inner opening (622) of said locking ring saddle until said lower surface is generally parallel to and proximal to said upper surface of said locking ring saddle; and wherein a niche (330) formed in said flat back to allow said latch portion to be rotatably inserted therein, and wherein a bench (334) that is aligned with an upper surface of locking ring saddle, is formed inside said niche.

14. The temple-ornamentation kit (400) of claim 13, wherein upon inserting said latch portion through said inner opening of said locking ring saddle and said stem portion is accommodated inside said inner opening of said locking ring saddle, such that said flat peripheral surface leans on said upper surface of said locking ring saddle, bringing the temple ornamentation kit (400) into a locked state and over said bench.

15. The temple-ornamentation kit (401) of claim 9, wherein a width of said stem portion is sized to be smaller than a smallest dimension of an inner opening of said locking ring saddle; wherein said latch portion is shaped like a pileus of a mushroom extends away from some of an external surface of said stem portion, forming a flat partial peripheral surface (536) that is generally parallel to said upper surface of said locking ring saddle, wherein said latch portion is configured to be inserted into and through said inner opening (622) of said locking ring saddle.

16. The temple-ornamentation kit (401) of claim 15, wherein upon inserting said latch portion through said inner opening of said locking ring saddle and said stem portion is accommodated inside said inner opening of said locking ring saddle, such that said flat peripheral surface leans on said upper surface of said locking ring saddle, bringing the temple ornamentation kit (401) into a locked state.

17. The temple-ornamentation kit (401) of claim 16, wherein said temple attaching device (400, 401) comprises a flat front (512) side, wherein upon reaching said locked state, wherein said flat front (512) leans on said flat back (612) and is proximal thereto, and wherein said flat partial peripheral surface does not extend away from said external surface of said stem portion, beyond said flat back (612).

18. The temple-ornamentation kit of claim 1, wherein said temple attaching device (200, 201) comprises a flat front (212) side, and wherein when said attachment interface locking portion is interlocked with said ornament locking portion and said axis is parallel to said flat back said temple attaching device reaches a locked state wherein said flat front (212) leans on said flat back (312) and is proximal thereto.

19. The temple-ornamentation kit of claim 1, wherein said locking ring saddle (320, 620, 621) is made of rigid materials.

* * * * *